United States Patent
Rofougaran et al.

(10) Patent No.: US 8,416,879 B2
(45) Date of Patent: Apr. 9, 2013

(54) SYSTEM AND METHOD PROVIDING SIGNAL COMBINING TO SUPPORT MULTIMODE COMMUNICATION

(75) Inventors: Ahmadreza Rofougaran, Newport Coast, CA (US); Arya Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 718 days.

(21) Appl. No.: 11/376,643

(22) Filed: Mar. 15, 2006

(65) Prior Publication Data
US 2007/0127590 A1 Jun. 7, 2007

Related U.S. Application Data

(60) Provisional application No. 60/741,572, filed on Dec. 1, 2005.

(51) Int. Cl.
*H04B 15/00* (2006.01)

(52) U.S. Cl.
USPC ........... 375/285; 375/304; 375/299; 375/296; 370/466; 370/445

(58) Field of Classification Search .................. 375/285, 375/304, 299
See application file for complete search history.

(56) References Cited

U.S. PATENT DOCUMENTS

| | | | |
|---|---|---|---|
| 5,101,499 A | | 3/1992 | Streck |
| 5,541,606 A * | | 7/1996 | Lennen ................ 342/357.77 |
| 5,862,457 A * | | 1/1999 | Winters .................. 455/103 |
| 6,111,673 A * | | 8/2000 | Chang et al. ................ 398/79 |
| 6,289,048 B1 * | | 9/2001 | Richards et al. ............. 375/235 |
| 6,304,140 B1 * | | 10/2001 | Thron et al. ................ 330/149 |
| 6,538,781 B1 * | | 3/2003 | Beierle et al. ................ 398/79 |
| 6,859,443 B1 * | | 2/2005 | Mushkin .................... 370/324 |
| 2002/0009057 A1 * | | 1/2002 | Blackwell et al. ........... 370/286 |
| 2002/0057726 A1 * | | 5/2002 | Williams et al. ............ 375/136 |
| 2002/0061031 A1 * | | 5/2002 | Sugar et al. ................. 370/466 |
| 2003/0098806 A1 | | 5/2003 | Green |
| 2004/0071226 A1 * | | 4/2004 | Shu et al. .................... 375/299 |
| 2005/0220214 A1 * | | 10/2005 | Waltho et al. ............... 375/295 |

FOREIGN PATENT DOCUMENTS

| | | |
|---|---|---|
| CN | 1258144 | 6/2000 |
| EP | 1119137 | 7/2001 |
| EP | 1207654 | 5/2002 |
| EP | 1220466 | 7/2002 |
| EP | 1670149 | 6/2006 |
| WO | WO 2005/088849 | 9/2005 |

* cited by examiner

*Primary Examiner* — Lihong Yu
(74) *Attorney, Agent, or Firm* — Thomas|Horstemeyer, LLP

(57) ABSTRACT

A system and method providing signal combining to support multimode communication. Various aspects of the present invention may provide a first input adapted to receive a first baseband signal corresponding to a first communication protocol. A second input may be provided, which is adapted to receive a second baseband signal corresponding to a second communication protocol. A spectral placement module may, for example, be adapted to spectrally shift the first baseband signal. For example, the spectral placement module may be adapted to spectrally shift the first baseband signal to one or more frequency bands substantially distinct from one or more frequency bands associated with the second baseband signal. The spectrally shifted first baseband signal and the second baseband signal, which may also be spectrally shifted, may then be combined to form a composite signal.

36 Claims, 6 Drawing Sheets

SYSTEM AND METHOD PROVIDING SIGNAL COMBINING TO SUPPORT MULTIMODE COMMUNICATION

CROSS-REFERENCE TO RELATED APPLICATIONS/INCORPORATION BY REFERENCE

This patent application is related to and claims priority from provisional patent application Ser. No. 60/741,572, filed Dec. 1, 2005, entitled "SYSTEM AND METHOD PROVIDING SIGNAL COMBINING TO SUPPORT MULTIMODE COMMUNICATION," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Communication devices (e.g., mobile communication devices) are continually increasing in popularity. Such communication devices include, for example and without limitation, cellular phones, paging devices, portable email devices, and personal digital assistants. Mobile communication devices, for example, provide the user with the capability to conduct communications while moving through a variety of environments.

Communication devices may operate in accordance with multiple communication modes. For example a mobile communication device may be adapted to operate in a cellular communication mode and a wireless computer network communication mode. Such multimode communication devices may utilize respective radio configurations for each communication mode. For example, various communication modes may correspond to different respective radios and/or different communication protocols.

Various communication modes may potentially operate in common frequency bands. Thus, the potential exists for transmissions (e.g., simultaneous transmissions) in various communication modes to interfere with each other. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method providing signal combining to support multimode communication, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
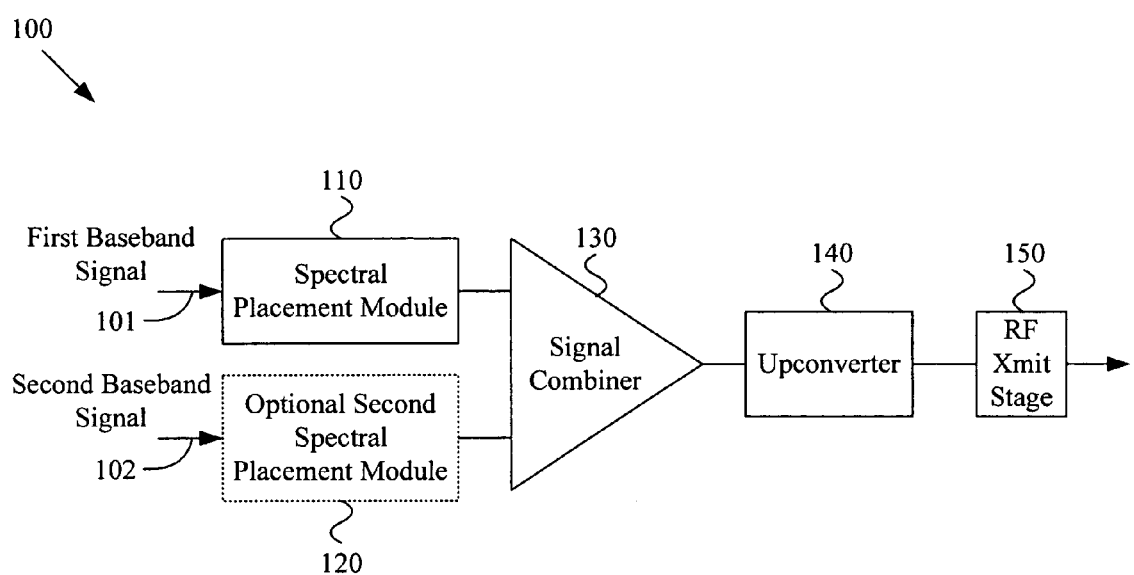
FIG. 1 is a diagram showing a portion of a first non-limiting exemplary communication system, in accordance with various aspects of the present invention.

FIG. 1 is a diagram showing a portion of a first non-limiting exemplary communication system 100, in accordance with various aspects of the present invention. The communication system (or device) may comprise characteristics of any of a variety of communication systems/devices (e.g., multimode wireless communication devices). For example and without limitation, the communication system may comprise characteristics of any of a variety of mobile wireless communication devices (e.g., cellular phones, paging devices, portable email devices, etc.). Also for example, the communication system may comprise characteristics of fixed communication systems or devices (e.g., network access points, base stations, satellites, wireless routers, set top boxes, etc.). Further for example, the communication system may comprise characteristics of a variety of electronic devices with wireless communication capability (e.g., televisions, music players, cameras, remote controls, personal digital assistants, handheld computers, gaming devices, etc.). Accordingly, the scope of various aspects of the present invention should not be limited by characteristics of particular communication systems or devices.

The following discussion will, at times, refer to various communication modes. A multimode communication device may, for example, be adapted to communicate in a plurality of such communication modes. For the following discussion, a communication mode may generally be considered to coincide with communication utilizing a particular communication protocol or standard. A non-limiting list of exemplary communication protocols includes various cellular communication protocols (e.g., GSM, GPRS, EDGE, CDMA, WCDMA, TDMA, PDC, etc.), various wireless networking protocols or standards, including WLAN, WMAN, WPAN and WWAN (e.g., IEEE 802.11, Bluetooth, IEEE 802.15, UWB, IEEE 802.16, IEEE 802.20, Zigbee, any WiFi protocol, etc.), various television communication standards, etc. The scope of various aspects of the present invention should not be limited by characteristics of particular communication modes or protocols, whether standard or proprietary.

The exemplary communication system 100 may comprise at least a first input 101 adapted to receive a first baseband signal. The first baseband signal may, for example, correspond to a first communication protocol (e.g., any of a variety of wireless communication protocols and/or standards). For example and without limitation, the first baseband signal may correspond to any of the previously mentioned communication protocols.

The exemplary communication system 100 may also comprise at least a second input 102 adapted to receive a second baseband signal. The second baseband signal may, for example, correspond to a second communication protocol (e.g., a second communication protocol different from the first communication protocol discussed above). For example and without limitation, the second baseband signal may correspond to any of the previously mentioned communication protocols.

The first baseband signal and the second baseband signal may, for example, be generated by one or more modules (i.e., hardware and/or software modules) of the communication system 100. For example, such modules may generate the first and second baseband signals independently (e.g., corresponding to independent respective communications). Alternatively, for example, such modules may generate the first and second baseband signals in a dependent manner (e.g., coordinating independent respective communications or utilizing both the first and second baseband signals for a single communication).

The exemplary communication system 100 may additionally comprise a spectral placement module 110 that is adapted to spectrally shift the first baseband signal (i.e., shift the frequency spectrum of the first baseband signal). In a non-limiting exemplary scenario, the spectral placement module 110 may be adapted to spectrally shift the first baseband signal by, at least in part, spectrally shifting the first baseband signal to one or more frequency bands that are substantially distinct from one or more frequency bands associated with the second baseband signal. Occupying such substantially distinct frequency bands, the spectrally shifted first baseband signal may, for example, be combined with the second baseband signal for simultaneous transmission with no interference, relatively little interference, or an acceptable level of interference.

In a non-limiting exemplary scenario, the spectral placement module 110 may be adapted to implement a frequency-hopping scheme with the first baseband signal. For example, in a scenario, where there are one or more frequency bands (e.g., a second frequency space) associated with the second baseband signal, the spectral placement module 110 may be adapted to shift the first baseband signal to numerous consecutive frequency spaces (or bands) that are substantially distinct from the second frequency space.

Figure 2:
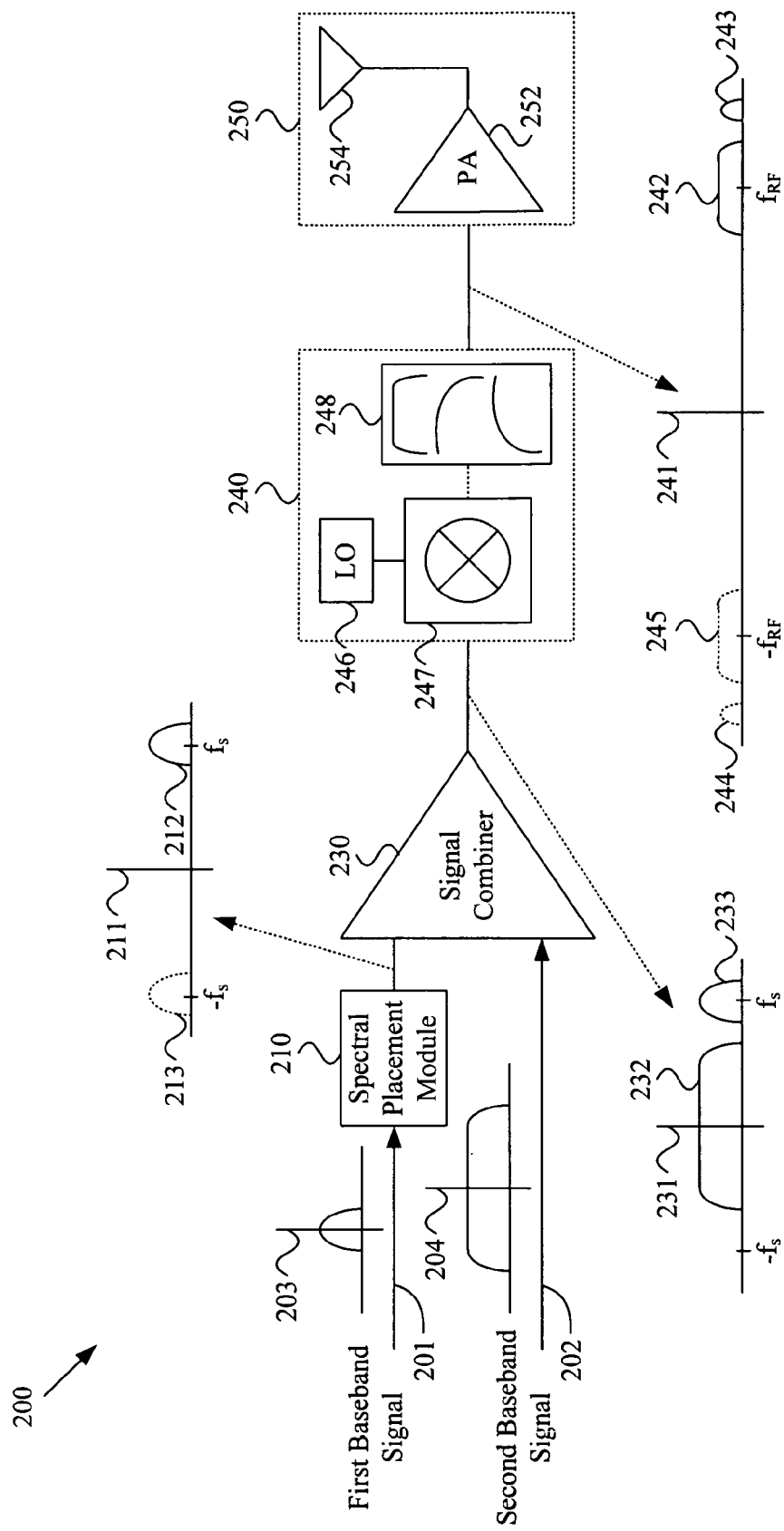
FIG. 2 is a diagram showing a portion of a second non-limiting exemplary communication system, in accordance with various aspects of the present invention.

In another non-limiting exemplary scenario, spectrally shifting the first baseband signal may result in the production of a spectral image (e.g., frequency content mirrored about a mixing frequency utilized to spectrally shift the first baseband signal). In such a scenario, the image may be accepted or rejected. A non-limiting example of such an image is illustrated in FIG. 2 and will be discussed later.

Figure 3:
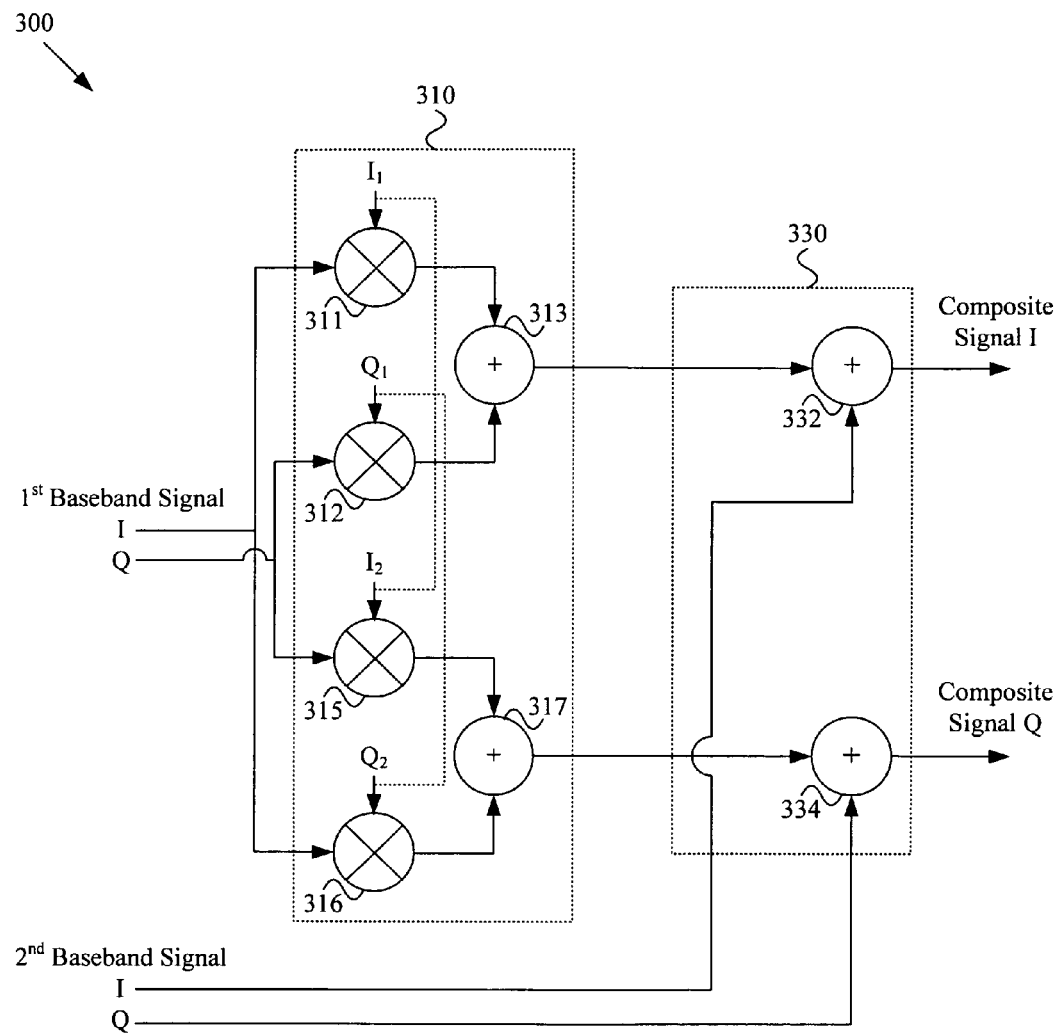
FIG. 3 is a diagram showing a portion of a third non-limiting exemplary communication system, in accordance with various aspects of the present invention.

In a scenario where an image is produced, the spectral placement module 110 may be adapted to reject such an image (e.g., reject an upper or lower image). The spectral placement module 110 may be adapted to reject such an image in any of a variety of manners. For example and without limitation, the spectral placement module 110 may comprise an image reject mixer utilized to spectrally shift the first baseband signal. Such an image reject mixer generally spectrally shifts a signal and rejects an image associated with the spectrally shifted signal. An exemplary image reject mixer is illustrated in FIG. 3 and will be discussed later. Also for example, the spectral placement module 110 may utilize an image reject filter to remove an unwanted image. The scope of various aspects of the present invention should not be limited by the utilization of image rejection or by any particular manner of performing such image rejection.

The exemplary communication system 100 may also comprise a second spectral placement module 120. Such a second spectral placement module 120 may, for example, share any or all characteristics with the spectral placement module 110 discussed previously. The incorporation of such a second spectral placement module 120 may, for example, provide spectral shifting flexibility. For example, in such an exemplary configuration, either or both of the first and second baseband signals may be spectrally shifted to substantially distinct frequency spaces. Also for example, in such an exemplary configuration, either or both of the first and second baseband signals may be frequency hopped. Note that though the second spectral placement module 120 is illustrated separate from the first spectral placement module 110, the second spectral placement module 120 may share any or all hardware and/or software components with the spectral placement module 110.

The exemplary communication system 100 may further comprise a signal combiner 130 that is adapted to generate a composite signal comprising various input signals to the signal combiner 130. For example, the composite signal may simultaneously (i.e., at an instant in time) comprise components associated with various input signals. Note that such simultaneity need not always be present. For example, at a first instant in time, the signal output from the signal combiner 130 might comprise a plurality of components associated with a plurality of respective input signals, at a second instant in time, the signal output from the signal combiner 130 might comprise a single component associated with a single respective input signal, and at a third instant in time, the signal output from the signal combiner 130 might comprise no components.

In a first non-limiting exemplary scenario, the signal combiner 130 may receive a first signal that is based on the first baseband signal (e.g., associated with a first communication protocol). Also, the signal combiner 130 may receive a second signal that is based on the second baseband signal (e.g., associated with a second communication protocol). In such a scenario, the signal combiner 130 may combine the first and second signals to generate a composite signal, where the composite signal simultaneously comprises a first signal component based on the first baseband signal and a second signal component based on the second baseband signal. In such a scenario, for example where the frequency spectra of the first and second baseband signals do not overlap, the first and second baseband signals might not be spectrally shifted prior to combining by the signal combiner 130. In such a scenario, the spectral placement module 110 (and optionally, the second spectral placement module 120) may receive a control signal indicating whether or not to perform spectral shifting and/or to what degree spectral shifting should be implemented.

In a second non-limiting exemplary scenario, the signal combiner 130 may receive a first signal from the spectral placement module 110 that is based on the spectrally shifted first baseband signal. Also, the signal combiner 130 may receive a second signal that is based on the second baseband signal. In such a scenario, the signal combiner 130 may combine the first and second signals to generate a composite signal, where the composite signal simultaneously comprises a first signal component based on the spectrally shifted first baseband signal and a second signal component based on the second baseband signal (e.g., not spectrally shifted).

In a third non-limiting exemplary scenario, the signal combiner 130 may receive a first signal from the spectral placement module 110 that is based on the spectrally shifted first baseband signal. Also, the signal combiner 130 may receive a second signal from the second spectral placement module 120 that is based on the spectrally shifted second baseband signal. In such a scenario, the signal combiner 130 may combine the first and second signals to generate a composite signal, where the composite signal simultaneously comprises a first signal component based on the spectrally shifted first baseband signal and a second signal component based on the spectrally shifted second baseband signal.

The exemplary communication system 100 may also comprise an upconverter 140 adapted to upconvert a signal (e.g., the composite signal from the signal combiner 130) for transmission. As a non-limiting example, the upconverter 140 may receive a composite signal from the signal combiner 130, where the composite signal comprises at least one component of a baseband signal. In such an example, the upconverter 140 may comprise upconverting (e.g., mixing) hardware adapted to convert the received composite signal to RF frequencies for subsequent transmission. Such conversion may, for example, comprise performing direct conversion or multi-stage conversion. The upconverter 140 may, for example, comprise various mixing, frequency generating and filtering components utilized for upconverting a communication signal to an RF frequency.

The exemplary communication system 100 may further comprise a RF transmission stage 150 adapted to transmit an RF signal. Such an RF signal may, for example, be associated with the composite signal output from the signal combiner 130 and upconverted by the upconverter 140. The RF transmission stage 150 may, for example and without limitation, comprise various power amplifier, filtering and antenna components utilized for transmission of an RF signal.

The exemplary communication system 100 (and most other communication systems illustrated and discussed herein) is shown with two input signals for the sake of illustrative clarity and not limitation. For example, various aspects of the present invention readily extend to three or more input signals (e.g., three or more baseband signals).

The exemplary communication system 100 (and most other communication systems illustrated and discussed herein) generally illustrate spectrally shifting one or more baseband signals and combining baseband signals into a composite signal for subsequent transmission. Note that various aspects of the present invention are readily extensible to spectrally shifting IF and/or RF signals, which are then combined into a composite signal for upconverting/transmission or for transmission. Accordingly, the scope of various aspects of the present invention should not be limited by characteristics of baseband signals or the processing thereof.

Figure 4:
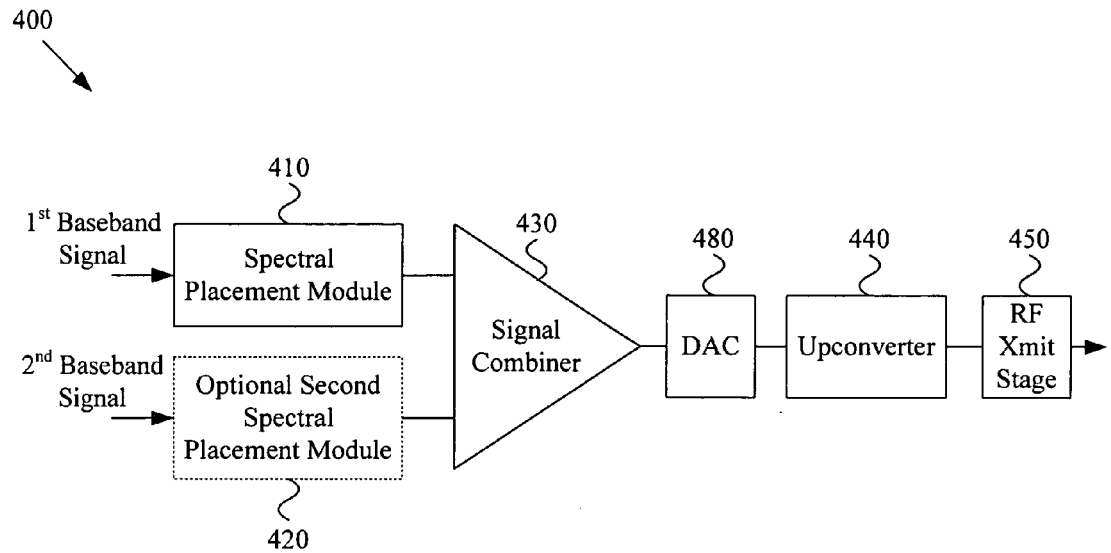
FIG. 4 is a diagram showing a portion of a fourth non-limiting exemplary communication system, in accordance with various aspects of the present invention.
Figure 5:
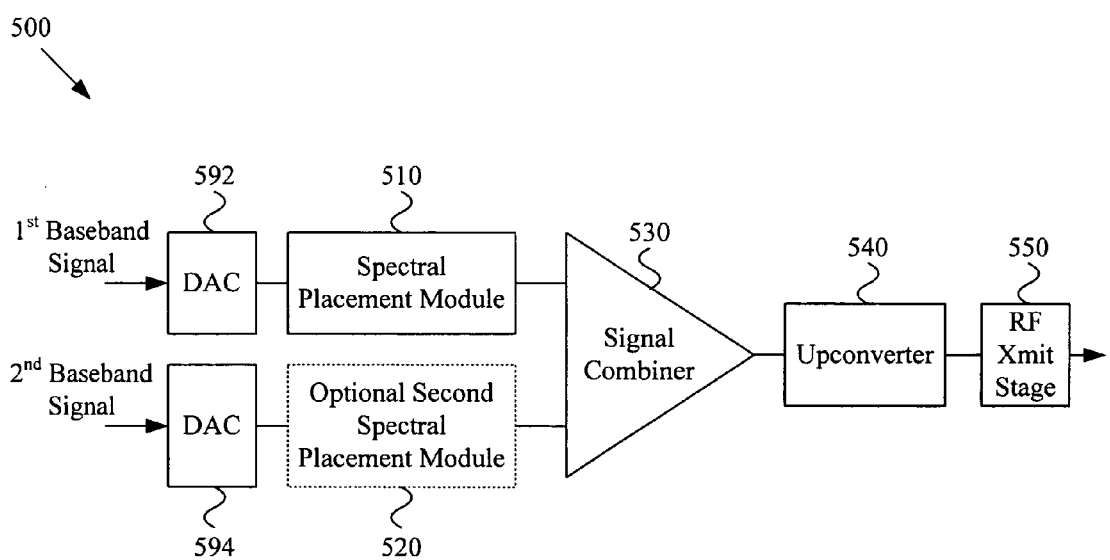
FIG. 5 is a diagram showing a portion of a fifth non-limiting exemplary communication system, in accordance with various aspects of the present invention.
Figure 6:
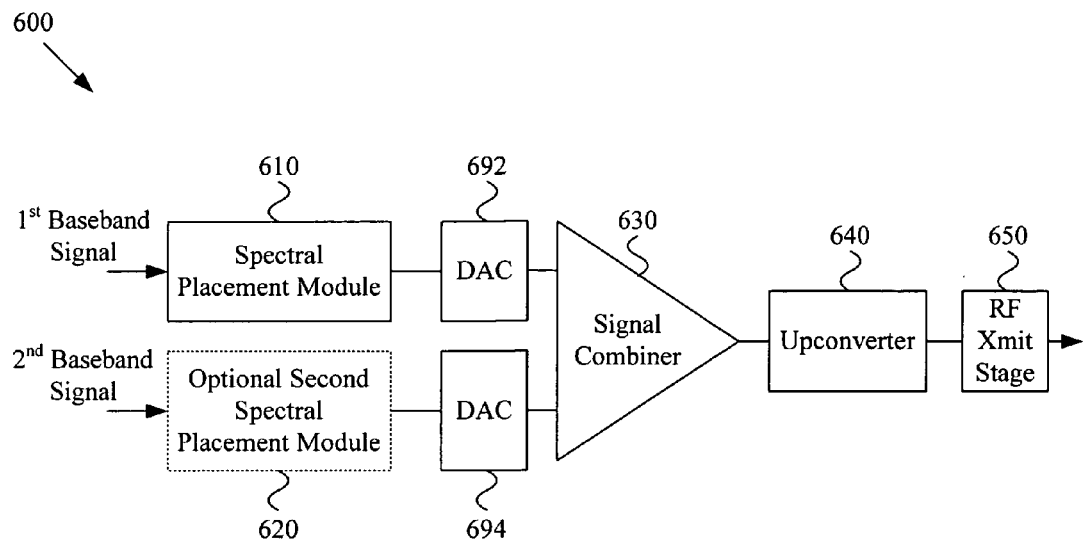
FIG. 6 is a diagram showing a portion of a sixth non-limiting exemplary communication system, in accordance with various aspects of the present invention.

Various components of the exemplary communication system 100 (and other communication systems illustrated and discussed herein) may be implemented in analog and/or digital circuitry. To illustrate this, the exemplary communication system 100 is not shown with analog-to-digital converters (ADCs) or digital-to-analog converters (DACs). FIGS. 4-6, to be discussed later, show various non-limiting exemplary configurations including such converters.

FIG. 2 is a diagram showing a portion of a second non-limiting exemplary communication system 200, in accordance with various aspects of the present invention. The communication system 200 may, for example and without limitation, share any or all characteristics with the communication system 100 illustrated in FIG. 1 and discussed previously.

The exemplary communication system 200 may comprise at least a first input 201 adapted to receive a first baseband signal. The first baseband signal may, for example, correspond to a first communication protocol (e.g., any of a variety of wireless communication protocols and/or standards). For example and without limitation, the first baseband signal may correspond to the Bluetooth communication protocol. FIG. 2 shows an exemplary frequency spectrum 203 associated with the first baseband signal.

The exemplary communication system 200 may also comprise at least a second input 202 adapted to receive a second baseband signal. The second baseband signal may, for example, correspond to a second communication protocol (e.g., a second communication protocol different from the first communication protocol discussed above). For example and without limitation, the first baseband signal may correspond to an IEEE 802.11 communication protocol (e.g., IEEE 802.11(b) or IEEE 802.11(g)). FIG. 2 shows an exemplary frequency spectrum 204 associated with the second baseband signal.

As with the exemplary communication system 100 discussed previously, the first baseband signal and the second baseband signal may, for example, be generated by one or more modules (i.e., hardware and/or software modules) of the communication system 200. For example, such modules may generate the first and second baseband signals independently or in a dependent manner.

The exemplary communication system 200 may additionally comprise a spectral placement module 210 that is adapted to spectrally shift the first baseband signal (i.e., shift the frequency spectrum of the first baseband signal). For example and without limitation, the spectral placement module 210 may share any or all characteristics with the spectral placement module 110 discussed previously.

In a non-limiting exemplary scenario, the spectral placement module 210 may be adapted to spectrally shift the first baseband signal by a frequency $f_s$. FIG. 2 shows an exemplary frequency spectrum 211 associated with the spectrally shifted first baseband signal. The exemplary frequency spectrum 211 shows a lower spectral image 213 and an upper spectral image 212 associated with shifting the spectrum of the first baseband signal. As discussed previously with regard to FIG. 1, one of the images may be cancelled (e.g., by an image reject mixer or filter). In this particular example, the spectral placement module 210 may comprise an image reject mixer that rejects the lower spectral image 213.

The exemplary communication system 200 may further comprise a signal combiner 230 that is adapted to generate a composite signal comprising various input signals to the signal combiner 230. The signal combiner 230 may, for example and without limitation, share any or all characteristics with the signal combiner 130 discussed previously. For example, the composite signal may simultaneously comprise components associated with various input signals.

In a non-limiting exemplary configuration illustrated in FIG. 2, the signal combiner 230 receives a first signal from the spectral placement module 210 that is based on the spectrally shifted first baseband signal. Also, the signal combiner 230 receives a second signal that is based on the second baseband signal. In such a configuration, the signal combiner 230 combines the first and second signals to generate a composite signal, where the composite signal simultaneously comprises a first signal component based on the spectrally shifted first baseband signal and a second signal component based on the second baseband signal (e.g., not spectrally shifted).

FIG. 2 shows an exemplary frequency spectrum 231 associated with the composite signal formed by the signal combiner 230. The spectrum 231 comprises a first portion 233 corresponding to the first signal component, and a second portion 232 corresponding to the second signal component. Note that the first portion 233 occupies a frequency space (e.g., one or more frequency bands) that is distinct from the frequency space occupied by the second portion 232.

The exemplary communication system 200 may also comprise an upconverter 240 adapted to upconvert a signal (e.g., the composite signal from the signal combiner 230) for transmission. The upconverter 240 may, for example and without limitation, share any or all characteristics with the upconverter 140 discussed previously.

The upconverter 240 may, for example, comprise a mixer 247, a local oscillator 246 and one or more filters 248. The mixer 247 may, for example, receive the composite signal from the signal combiner 230 and an RF mixing signal at frequency $f_{RF}$ from a local oscillator 246. The upconverter 240 may, for example, filter the upconverted signal from the mixer 247 with one or more filters 248. The output of the upconverter 240 may, for example, comprise a signal indicative of the composite signal spectrally shifted to an RF frequency.

FIG. 2 shows an exemplary frequency spectrum 241 associated with the RF signal formed by the upconverter 240. The frequency spectrum 241 comprises a first portion 243 corresponding to the first signal component and a second portion 242 corresponding to the second signal component. Note that the first portion 243 occupies a frequency space (e.g., one or more frequency bands) that is distinct from the frequency space occupied by the second portion 242. Also note that the first portion 243 and second portion 242 might be formed with a first mirror portion 244 and second mirror portion 245, respectively. Note that a mirror portion may either be removed or may be kept for later processing.

The exemplary communication system 200 may further comprise a RF transmission stage 250 adapted to transmit an RF signal. The RF transmission stage 250 may, for example and without limitation, share any or all characteristics with the RF transmission stage 150 discussed previously.

Such an RF signal may, for example, be associated with the composite signal output from the signal combiner 230 and upconverted by the upconverter 240. The RF transmission stage 250 may, for example and without limitation, comprise a power amplifier 252, antenna 254 and other components generally associated with RF signal transmission.

FIG. 3 is a diagram showing a portion of a third non-limiting exemplary communication system 300, in accordance with various aspects of the present invention. The exemplary communication system 300 may, for example and without limitation, share any or all characteristics with the exemplary communication systems 100, 200 discussed previously.

The exemplary communication system 300 may comprise a spectral placement module 310. The spectral placement module 310 may, for example and without limitation, share any or all characteristics with the exemplary spectral placement modules 110, 210 discussed previously.

The spectral placement module 310 comprises an image reject mixer. The spectral placement module 310 comprises a first mixer 311 that receives the "I" component of the first baseband signal (BB) and the "I" component of a mixing signal (IF). The output of the first mixer 311 may, for example, comprise a signal that is a function of $\cos(\omega_{BB})*\cos(\omega_{IF})$. The spectral placement module 310 may also comprise a second mixer 312 that receives the "Q" component of the first baseband signal (BB) and the "Q" component of the mixing signal (IF). The output of the second mixer 312 may, for example, comprise a signal that is a function of $\sin(\omega_{BB})*\sin(\omega_{IF})$. The outputs of the first mixer 311 and the second mixer 312 may then be combined with a first summer 313.

The spectral placement module 310 may also comprise a third mixer 315 that receives the "Q" component of the first baseband signal (BB) and the "I" component of the mixing signal (IF). The output of the third mixer 315 may, for example, comprise a signal that is a function of $\sin(\omega_{BB})*\cos(\omega_{IF})$. The spectral placement module 310 may also comprise a fourth mixer 316 that receives the "I" component of the first baseband signal (BB) and the "Q" component of the mixing signal (IF). The output of the fourth mixer 316 may, for example, comprise a signal that is a function of $\cos(\omega_{BB})*\sin(\omega_{IF})$. The outputs of the third mixer 315 and the fourth mixer 316 may then be combined with a second summer 317.

Note that operation of the image reject mixer may be adjusted to reject any image (e.g., an upper or lower image). For example, signs of the first and/or second adders 313, 317 or of other components or signals may be modified to reject the desired image.

The exemplary communication system 300 may comprise a signal combiner 330. The signal combiner 330 may, for example and without limitation, share any or all characteristics with the exemplary signal combiners 130, 230 discussed previously.

The signal combiner 330 may, for example, comprise a third summer 332, which sums the output signal from the first summer 313 and the "I" component of the second baseband signal. The signal combiner 330 may also, for example, comprise a fourth summer 334, which sums the output signal from the second summer 317 and the "Q" component of the second baseband signal.

As illustrated in FIG. 3, the first baseband signal and the second baseband signal may be separated into I and Q components. This principal also applies to all systems and methods discussed herein. For example, though the exemplary communication systems 100, 200 discussed previously each show one respective line for each of the first and second baseband signals and subsequent signals derived therefrom, such signals may readily be separated into I and Q components and processed individually.

As discussed briefly above, various portions of the exemplary communication systems and/or methods discussed herein may be implemented in the analog and/or digital domains. FIGS. 4-6, to be discussed next, present non-limiting examples of a variety of potential configurations.

FIG. 4 is a diagram showing a portion of a fourth non-limiting exemplary communication system 400, in accordance with various aspects of the present invention. The exemplary communication system 400 may, for example and without limitation, share any or all characteristics with the exemplary communication systems 100-300 illustrated in FIGS. 1-3 and discussed previously.

The exemplary communication system 400 may, for example, comprise a spectral placement module 410, an optional second spectral placement module 420, a signal combiner 430, an upconverter 440 and a RF transmission stage 450 similar in various respects to like-named components of exemplary systems 100-300 discussed previously. The exemplary communication system 400 may also comprise a digital-to-analog converter 480.

For example, the spectral placement module 410, optional second spectral placement module 420 and signal combiner 430 may operate in the digital domain. The digital-to-analog converter 480 may then convert the digital composite signal output from the signal combiner 430 to the analog domain. The upconverter 440 and RF transmission stage 450 may then perform their respective operations in the analog domain.

FIG. 5 is a diagram showing a portion of a fifth non-limiting exemplary communication system 500, in accordance with various aspects of the present invention. The exemplary communication system 500 may, for example and without limitation, share any or all characteristics with the exemplary communication systems 100-300 illustrated in FIGS. 1-3 and discussed previously.

The exemplary communication system 500 may, for example, comprise a spectral placement module 510, an optional second spectral placement module 520, a signal combiner 530, an upconverter 540 and a RF transmission stage 550 similar in various respects to like-named components of exemplary systems 100-400 discussed previously. The exemplary communication system 500 may also comprise a first digital-to-analog converter 592 and a second digital-to-analog converter 594.

For example, the spectral placement module 510, optional second spectral placement module 520 and signal combiner 530 may operate in the analog domain. The first digital-to-analog converter 592 may convert the first baseband signal to the analog domain for processing by the spectral placement module 510. The second digital-to-analog converter 594 may convert the second baseband signal to the analog domain for processing by the second spectral placement module 520 or signal combiner 530. The signal combiner 530 then combines signals in the analog domain to generate an analog composite signal, which is then upconverted and transmitted by the upconverter 540 and RF transmission stage 550, respectively.

As mentioned previously, various signals may, in various respective exemplary configurations, be characterized by baseband, IF and/or RF frequencies. FIG. 6 shows a non-limiting exemplary configuration where signals are converted to RF frequencies prior to the creation of the composite signal.

FIG. 6 is a diagram showing a portion of a sixth non-limiting exemplary communication system 600, in accordance with various aspects of the present invention. The exemplary communication system 600 may, for example and without limitation, share any or all characteristics with the exemplary communication systems 100-300 illustrated in FIGS. 1-3 and discussed previously.

The exemplary communication system 600 may, for example, comprise a spectral placement module 610, an optional second spectral placement module 620, a signal combiner 630, an upconverter 640 and a RF transmission stage 650 similar in various respects to like-named components of exemplary systems 100-500 discussed previously. The exemplary communication system 600 may also comprise a first digital-to-analog converter 692 and second digital-to-analog converter 694.

For example, the spectral placement module 610 and optional second spectral placement module 620 may operate in the analog domain. The first digital-to-analog converter 692 may convert the first spectrally shifted baseband signal output from the spectral placement module 610 to the analog domain for processing by the combining module 630. The second digital-to-analog converter 694 may convert the second baseband signal (or spectrally shifted second baseband signal) to the analog domain for processing by the signal combiner 630. The signal combiner 630 then combines signals in the analog domain to generate an analog composite signal, which is then upconverted and transmitted by the upconverter 640 and RF transmission stage 650, respectively.

Figure 7:
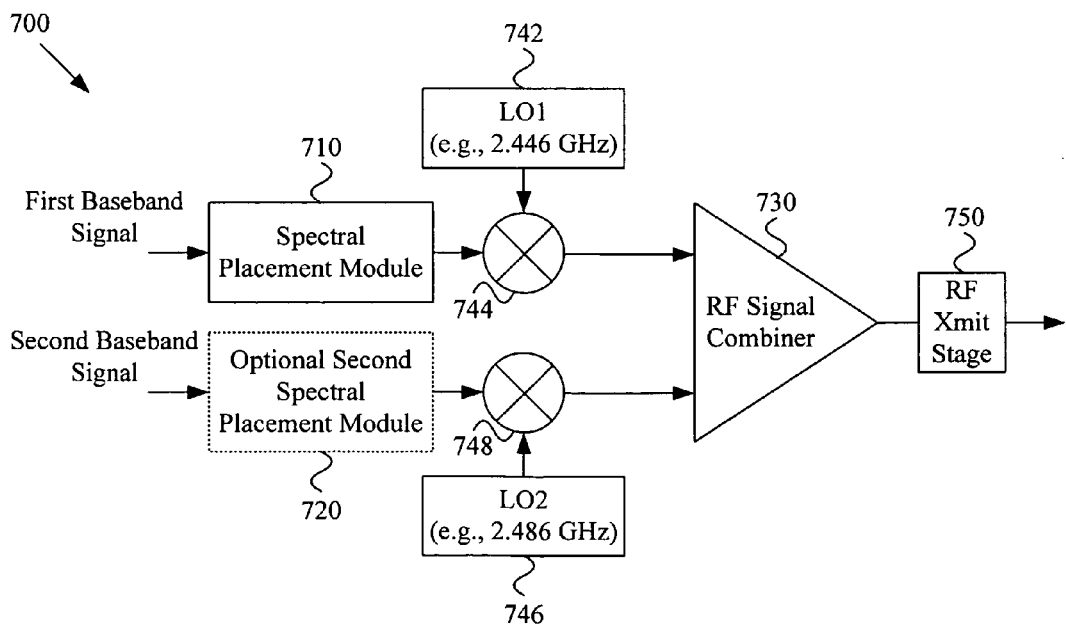
FIG. 7 is a diagram showing a portion of a seventh non-limiting exemplary communication system, in accordance with various aspects of the present invention.

As mentioned previously, various signals may, in various respective exemplary configurations, be characterized by baseband, IF and/or RF frequencies. FIG. 7 shows a non-limiting exemplary configuration where signals are converted to RF frequencies prior to the creation of the composite signal.

FIG. 7 is a diagram showing a portion of a seventh non-limiting exemplary communication system 700, in accordance with various aspects of the present invention. The exemplary communication system 700 may, for example and without limitation, share any or all characteristics with the exemplary systems 100-600 illustrated in FIGS. 1-6 and discussed previously.

The exemplary communication system 700 may comprise a first mixer 744 that receives a spectrally shifted first baseband signal from the spectral placement module 710 and a first RF mixing signal (e.g., a 2.446 GHz signal generally associated with the Bluetooth communication protocol) from a first local oscillator 742. The exemplary communication system 700 may also comprise a second mixer 748 that receives a second baseband signal (or a spectrally shifted second baseband signal) and a second RF mixing signal (e.g., a 2.486 GHz signal generally associated with the IEEE 802.11(g) communication protocol) from a second local oscillator 746.

The exemplary communication system 700 may comprise an RF signal combiner 730 that is adapted to combine input RF signals. The RF signal combiner 730 may, for example, receive and combine the output signals from the first mixer 744 and second mixer 748 to generate an RF composite signal. The exemplary communication system 700 may also comprise a RF transmission stage 750 that receives the RF composite signal from the RF signal combiner 730 and transmit the signal.

The exemplary communication systems 100-700 illustrated in FIGS. 1-7 and discussed previously provided non-limiting exemplary illustrations of various aspects of the present invention. Accordingly, the scope of various aspects of the present invention should not be limited by particular characteristics of the exemplary communication systems 100-700.

For illustrative clarity, the exemplary systems 100-700 illustrated in FIGS. 1-7 were presented in terms of various functional modules. Various modules may, for example, be implemented in hardware, software or a combination thereof. Various modules may, for example, be implemented in a single integrated circuit or a combination of integrated circuits. Also, various modules may share various sub-modules and/or subcomponents. For example and without limitation, various hardware modules may share various electrical components, and various software modules may share various software subroutines. Accordingly, the scope of various aspects of the present invention should not be limited by characteristics of any particular hardware and/or software implementation or by any arbitrary boundaries between various functional modules.

Also for illustrative clarity, various signals (or associated pathways) were represented in the exemplary systems 100-

700 utilizing single lines and were generally referred to as "signals." It should be noted that such signals may be complex or real, depending on the particular implementation. For example and without limitation, with reference to FIG. 2, the input signal to the upconverter 240 may be complex, the local oscillator 246 may output a complex signal, and the signal output from the upconverter 240 to the RF transmission stage 250 may be real. Also for example, the respective input signals to the upconverters illustrated in FIGS. 2-7 may be complex, and the respective signals output from such upconverters may be real. Further for example, referring to FIG. 7, the input signals to the first mixer 744 and second mixer 744 (including the signals from the first local oscillator 742 and second local oscillator 746) may be complex. Still further for example, the output signals from the exemplary spectral placement modules of FIGS. 1-7 may be complex. Accordingly, the scope of various aspects of the present invention should not be limited by real or complex characteristics of one or more particular signals.

Figure 8:
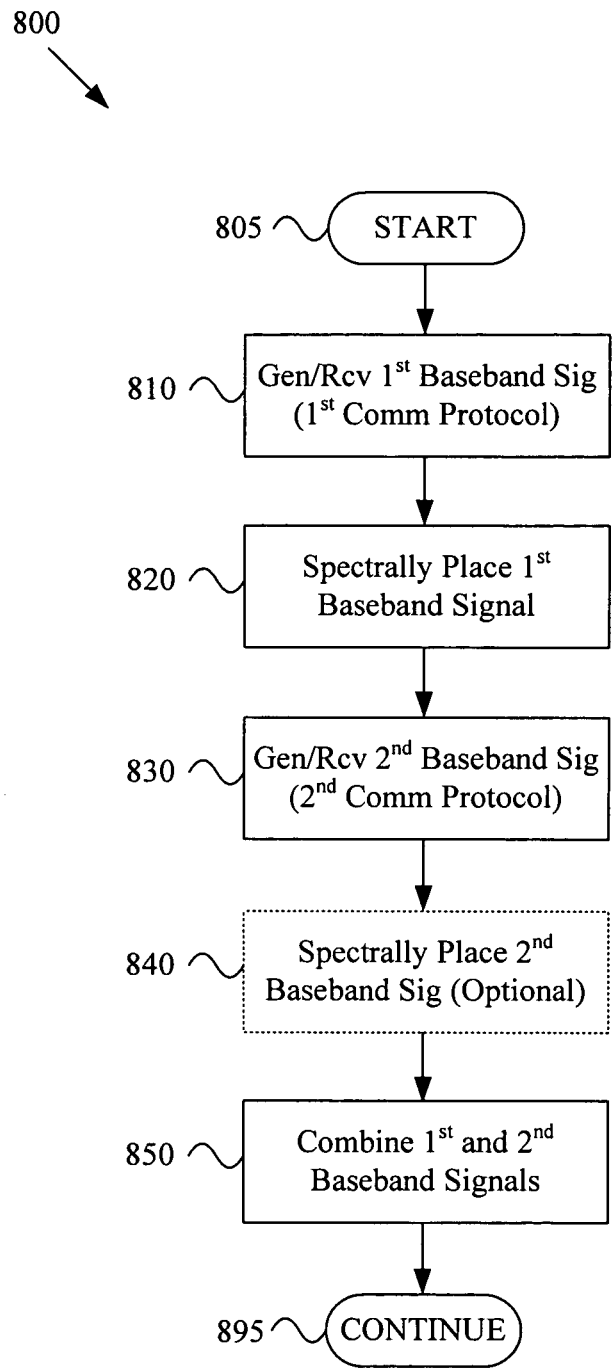
FIG. 8 is a diagram illustrating a first non-limiting exemplary method for combining signals in support of multimode communications, in accordance with various aspects of the present invention.

FIG. 8 is a diagram illustrating a first non-limiting exemplary method 800 for combining signals in support of multi-mode communications, in accordance with various aspects of the present invention. The exemplary method 800 may share any or all functional characteristics with the exemplary systems 100-700 illustrated in FIGS. 1-7 and discussed previously.

The exemplary method 800 may begin executing at step 805. The exemplary method 800 (and all methods discussed herein) may begin executing for any of a variety of reasons. For example and without limitation, the exemplary method 800 may begin executing in response to a user input, a power-up condition or a reset condition. Also for example, the exemplary method 800 may begin executing in response to a detected event (e.g., a timer expiration, detected signal, detected network access point, system command, etc.). Further for example, the exemplary method 800 may begin executing in response to a determination to communicate in a plurality of communication modes simultaneously. Still further for example, the exemplary method 800 may begin executing in response to a determination to utilize bandwidth in a plurality of communication systems for a single communication or multiple communications. Accordingly, the scope of various aspects of the present invention should not be limited by characteristics of any particular initiating cause or condition.

The exemplary method 800 may, at step 810, comprise generating and/or receiving a first baseband signal corresponding to a first communication protocol. Step 810 may, for example and without limitation, share any or all functional characteristics with the first input 101 of the exemplary system 100 illustrated in FIG. 1 and discussed previously.

The first baseband signal may, for example, correspond to a first communication protocol (e.g., any of a variety of wireless communication protocols and/or standards). In an exemplary scenario where step 810 comprises receiving the first baseband signal, step 810 may comprise receiving the first baseband signal in any manner generally associated with receiving a baseband signal.

The first baseband signal may, for example, be generated by one or more modules (i.e., hardware and/or software modules) of a communication system implementing the exemplary method 800. Step 810 may, for example, comprise generating the first baseband signal independently (e.g., corresponding to an independent communication). Step 810 may alternatively, for example, comprise generating the first baseband signal in a dependent manner (e.g., coordinating independent respective communications or utilizing both the first baseband signal and other baseband signals for a single communication).

The exemplary method 800 may, at step 820, comprise spectrally placing (or shifting) the first baseband signal (e.g., received at step 810). Step 820 may, for example and without limitation, share any or all functional characteristics with the spectral placement modules 110-710 of the exemplary systems 100-700 illustrated in FIGS. 1-7 and discussed previously.

Step 820 may, for example, comprise spectrally shifting the first baseband signal by, at least in part, spectrally shifting the first baseband signal to one or more frequency bands that are substantially distinct from one or more frequency bands associated with a second baseband signal. Occupying such substantially distinct frequency bands, the spectrally shifted first baseband signal may, for example, be combined with the second baseband signal for simultaneous transmission with no interference, relatively little interference, or an acceptable level of interference.

In a non-limiting exemplary scenario, step 820 may comprise implementing a frequency-hopping scheme with the first baseband signal. For example, in a scenario where there are one or more frequency bands (e.g., a second frequency space) associated with a second baseband signal, step 820 may comprise spectrally shifting the first baseband signal to numerous consecutive frequency spaces (or bands) that are substantially distinct from the second frequency space.

In another non-limiting exemplary scenario, spectrally shifting the first baseband signal may result in the production of a spectral image (e.g., frequency content mirrored about a mixing frequency utilized to spectrally shift the first baseband signal). In such a scenario, step 820 may comprise accepting or rejecting the image.

In a scenario where an image is rejected, step 820 may comprise rejecting the image in any of a variety of manners. For example and without limitation, step 820 may comprise performing image reject mixing to spectrally shift the first baseband signal. Such image reject mixing generally comprises spectrally shifting a signal and rejecting an image associated with the spectrally shifted signal. Also for example, step 820 may comprise filtering out an unwanted image. The scope of various aspects of the present invention should not be limited by the utilization of image rejection or by any particular manner of performing such image rejection.

The exemplary method 800 may, at step 830, comprise generating and/or receiving a second baseband signal corresponding to a second communication protocol (e.g., different from the first communication protocol). Step 830 may, for example and without limitation, share any or all functional characteristics with the second input 102 of the exemplary system 100 illustrated in FIG. 1 and discussed previously.

The second baseband signal may, for example, correspond to a second communication protocol (e.g., any of a variety of wireless communication protocols and/or standards). In an exemplary scenario where step 830 comprises receiving the second baseband signal, step 830 may comprise receiving the second baseband signal in any manner generally associated with receiving a baseband signal.

The second baseband signal may, for example, be generated by one or more modules (i.e., hardware and/or software modules) of a communication system implementing the exemplary method 800. Step 830 may, for example, comprise generating the second baseband signal independently (e.g., corresponding to a communication independent of a communication associated with the first baseband signal). Step 830 may alternatively, for example, comprise generating the second baseband signal in a dependent manner (e.g., coordinating independent respective communications or utilizing both the second baseband signal and the first baseband signal for a single communication).

The exemplary method 800 may, at step 840, in various optional exemplary scenarios, comprise spectrally shifting the second baseband signal (e.g., at received at step 830). Step 840 may, for example and without limitation, share any or all functional characteristics with step 820 and/or the second spectral placement modules 120-720 of the exemplary systems 100-700 illustrated in FIGS. 1-7 and discussed previously.

Performing step 840 may, for example, provide spectral shifting flexibility. For example, by performing step 840, or providing the option to perform step 840, either or both of the first and second baseband signals may be spectrally shifted to substantially distinct frequency spaces. Also for example, in such an exemplary scenario, either or both of the first and second baseband signals may be frequency hopped.

The exemplary method 800 may, at step 850, comprise generating a composite signal comprising a first simultaneous component based on the first baseband signal and a second simultaneous component based on the second baseband signal. Step 850 may, for example and without limitation, share any or all characteristics with the exemplary signal combiners 130-730 of the exemplary systems 100-700 illustrated in FIGS. 1-7 and discussed previously.

In a first non-limiting exemplary scenario, steps 820 and 840 do not spectrally shift the first and second baseband signals. In such an exemplary scenario, step 850 may comprise combining the first baseband signal received or generated at step 810 with the second baseband signal received or generated at step 830. Step 850 may thus comprise generating a composite signal that simultaneously comprises a first signal component based on the first baseband signal and a second signal component based on the second baseband signal. In such an exemplary scenario, for example where the frequency spectra of the first and second baseband signals do not overlap, the first and second baseband signals might not be spectrally shifted prior to combining at step 850.

In a second non-limiting exemplary scenario, step 840 might not be performed. In such an exemplary scenario, step 850 may comprise combining the first baseband signal received or generated at step 810 and spectrally shifted at step 820 with the second baseband signal received or generated at step 830. Step 850 may thus comprise generating a composite signal that simultaneously comprises a first signal component based on the spectrally shifted first baseband signal and a second signal component based on the second baseband signal (e.g., not spectrally shifted).

In a third non-limiting exemplary scenario, both spectrum-shifting steps 820 and 840 might be performed. In such an exemplary scenario, step 850 may comprise combining the first baseband signal received or generated at step 810 and spectrally shifted at step 820 with the second baseband signal received or generated at step 830 and spectrally shifted at step 840. Step 850 may thus comprise generating a composite signal that simultaneously comprises a first signal component based on the spectrally shifted first baseband signal and a second signal component based on the spectrally shifted second baseband signal.

The exemplary method 800 may, at step 895, comprise performing any of a large variety of continued processing. For example and without limitation, step 895 may comprise performing various operations associated with communicating the composite signal formed at step 850. Such operations may, for example, comprise upconverting and transmitting the composite signal. Step 895 may, for example, share various functional characteristics with the upconverters 140-740 and RF transmission stages 150-750 discussed previously.

Also for example, step 895 may comprise directing execution flow of the exemplary method 800 back up to previously discussed steps (e.g., for generating/receiving additional signals or for performing additional spectral placement operations). The scope of various aspects of the present invention should not be limited by characteristics of any particular continued processing.

The exemplary method 800 was presented with two baseband signals for the sake of illustrative clarity and not limitation. For example, various aspects of the present invention readily extend to three or more input signals. Additionally, as discussed previously with regard to the exemplary communication systems 100-700, various aspects of the exemplary method 800 may be implemented in the analog and/or digital domains.

The exemplary method 800 also generally comprises spectrally shifting one or more baseband signals and combining baseband signals into a composite signal for subsequent transmission. Note that various aspects of the present invention are readily extensible to spectrally shifting IF and/or RF signals, which are then combined into a composite signal for upconverting/transmission or for transmission. Accordingly, the scope of various aspects of the present invention should not be limited by characteristics of baseband signals or the processing thereof.

The exemplary method 800 was presented to provide non-limiting examples of various aspects of the present invention. Accordingly, the scope of various aspects of the present invention should not be limited by specific characteristics of the exemplary method 800.

In summary, various aspects of the present invention provide a system and method providing signal combining to support multimode communication. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A multimode communication system, comprising:
   at least a first module comprising circuitry, the first module being operable to, at least:
      generate a first baseband wireless signal corresponding to a first wireless communication protocol; and
      generate a second baseband wireless signal corresponding to a second wireless communication protocol different from the first wireless communication protocol, the second baseband wireless signal characterized by a baseband frequency bandwidth of the second baseband wireless signal; and
   at least a second module comprising circuitry, the second module being operable to, at least:
      receive the first baseband wireless signal;
      receive the second baseband wireless signal;
      spectrally shift an in-phase (I) component of the received first baseband wireless signal to a frequency space beyond the baseband frequency bandwidth, the spectral shift including mixing the I component and quadrature phase (Q) component of the first baseband wireless signal with respective I and Q components of a mixing signal;

spectrally shift the Q component of the received first baseband wireless signal to the same frequency space beyond the baseband frequency bandwidth, the spectral shift including mixing the I and Q components of the first baseband wireless signal with respective Q and I components of the mixing signal; and generate a composite wireless signal comprising, at an instant in time, an I composite component and a Q composite component, each composite component including a first component based on the spectrally-shifted first baseband wireless signal, and a second component based on the second baseband wireless signal that has not been spectrally-shifted.

2. The multimode communication system of claim 1, wherein the second module is operable to generate the composite signal by, at least in part, combining the first component and the second component at radio frequency (RF) frequencies.

3. The multimode communication system of claim 1, wherein the second module is operable to generate the composite signal by, at least in part, operating to combine the spectrally-shifted I component of the first baseband wireless signal with an I component of the second baseband wireless signal and operating to combine the spectrally-shifted Q component of the first baseband wireless signal with a Q component of the second baseband wireless signal.

4. The multimode communication system of claim 1, wherein the second module is operable to spectrally shift the first baseband wireless signal to the frequency space beyond the baseband frequency bandwidth by, at least in part, spectrally shifting the first baseband wireless signal to a plurality of frequency bands not associated with the second baseband wireless signal.

5. The multimode communication system of claim 1, wherein the second module is operable to spectrally shift the received first baseband wireless signal to the frequency space beyond the baseband frequency bandwidth by, at least in part, frequency hopping the first baseband wireless signal to a plurality of frequency bands substantially distinct from one or more frequency bands associated with the second baseband wireless signal, which is not frequency-hopped.

6. The multimode communication system of claim 1, wherein the second module is operable to reject an image associated with the spectrally-shifted I component of the first baseband wireless signal and reject an image associated with the spectrally-shifted Q component of the first baseband wireless signal.

7. The multimode communication system of claim 6, wherein the second module is operable to, prior to generating the composite signal, combine a first mixed component including the I component of the first baseband wireless signal and an I component of the mixing signal with a second mixed component including the Q component of the first baseband wireless signal with a Q component of the mixing signal to provide the spectrally-shifted I component of the first baseband wireless signal and combine a third mixed component including the Q component of the first baseband wireless signal and the I component of the mixing signal with a fourth mixed component including the I component of the first baseband wireless signal with the Q component of the mixing signal to provide the spectrally-shifted Q component of the first baseband wireless signal.

8. The multimode communication system of claim 6, wherein the second module is operable to upconvert the composite signal to a radio frequency (RF) frequency range and perform the image rejection on the upconverted composite signal.

9. The multimode communication system of claim 1, where the first baseband wireless signal, second baseband wireless signal and composite signal are digital signals.

10. The multimode communication system of claim 1, where the first baseband wireless signal, second baseband wireless signal and composite signal are analog signals.

11. The multimode communication system of claim 1, where the first wireless communication protocol is based on a Bluetooth standard, and the second wireless communication protocol is based on an IEEE 802.11 standard.

12. The multimode communication system of claim 1, where the composite signal comprises a baseband signal.

13. The multimode communication system of claim 1, where the composite signal comprises an intermediate frequency (IF) signal.

14. The multimode communication system of claim 1, where the composite signal comprises a radio frequency (RF) signal.

15. The multimode communication system of claim 1, wherein the at least a second module operates to upconvert the composite signal to a radio frequency (RF) signal that comprises the composite signal shifted to an RF frequency for transmission.

16. The multimode communication system of claim 1, where the first wireless communication protocol is associated with a first baseband frequency band and the second wireless communication protocol is associated with a second baseband frequency band different from the first baseband frequency band, and where the second baseband frequency band at least partially overlaps the first baseband frequency band.

17. The multimode communication system of claim 1, where the multimode communication system is a personal mobile communication device.

18. A method for communicating, the method comprising:
generating a first baseband wireless signal corresponding to a first wireless communication protocol;
generating a second baseband wireless signal corresponding to a second wireless communication protocol that is different from the first wireless communication protocol, the second baseband wireless signal characterized by a baseband frequency bandwidth of the second baseband wireless signal;
spectrally shifting an in-phase (I) component of the first baseband wireless signal to a frequency space beyond the baseband frequency bandwidth by mixing the in-phase (I) component and a quadrature (Q) component of the first baseband wireless signal with respective I and Q components of a mixing signal;
spectrally shifting an quadrature phase (Q) component of the first baseband wireless signal to a frequency space beyond the baseband frequency bandwidth by mixing the quadrature (Q) component and in-phase (I) component of the first baseband wireless signal with respective I and Q components of the mixing signal; and
generating a composite wireless signal comprising, at an instant in time, a first component based on the spectrally-shifted first baseband wireless signal and a second component based on the second baseband wireless signal where the first baseband wireless signal and the second baseband wireless signal are converted from digital signals to analog signals prior to generating the composite wireless signal.

19. The method of claim 18, wherein said generating a composite signal comprises combining the first component and the second component at radio frequencies (RF) frequencies.

20. The method of claim 18, wherein said generating a composite signal comprises generating the composite signal by, at least in part, combining the spectrally-shifted first baseband wireless signal and the second baseband wireless signal.

21. The method of claim 18, wherein said spectrally shifting the first baseband signal comprises spectrally shifting the first baseband wireless signal to a plurality of frequency bands not associated with the second baseband wireless signal.

22. The method of claim 18, wherein said spectrally shifting the first baseband wireless signal comprises frequency hopping the first baseband wireless signal to a plurality of frequency bands substantially distinct from one or more frequency bands associated with the second baseband wireless signal, which is not frequency-hopped.

23. The method of claim 18, comprising rejecting an image associated with the spectrally-shifted I component of the first baseband wireless signal and rejecting an image associated with the spectrally-shifted Q component of the first baseband wireless signal.

24. The method of claim 23, comprising, prior to generating the composite signal, performing image rejection on the I and Q components associated with the spectrally-shifted first baseband wireless signal and not on a signal associated with the second wireless baseband signal.

25. The method of claim 23, comprising upconverting the composite signal to a radio frequency (RF) frequency range and performing said image rejection on the upconverted composite signal.

26. The method of claim 18, wherein the first baseband wireless signal and the second baseband wireless signal are digital signals.

27. The method of claim 18, wherein the first baseband wireless signal is converted from a digital signal to an analog signal prior to spectrally shifting the first baseband wireless signal.

28. The method of claim 18, wherein the first wireless communication protocol is based on a Bluetooth standard, and the second wireless communication protocol is based on an IEEE 802.11 standard.

29. The method of claim 18, wherein the composite signal comprises a baseband signal.

30. The method of claim 18, wherein the composite signal comprises an intermediate frequency (IF) signal.

31. The method of claim 18, wherein the composite signal comprises a radio frequency (RF) signal.

32. The method of claim 18, comprising upconverting the composite signal to a radio frequency (RF) signal that comprises the composite signal shifted to an RF frequency for transmission.

33. The method of claim 18, wherein the first wireless communication protocol is associated with a first baseband frequency band and the second wireless communication protocol is associated with a second baseband frequency band different from the first baseband frequency band, where the second baseband frequency band at least partially overlaps the first baseband frequency band.

34. The method of claim 18, comprising performing the method in a personal mobile communication device.

35. Circuitry in a multimode communication system, wherein the circuitry is operable to, at least:
receive a first wireless signal associated with a first wireless communication protocol;
receive, by the spectral placement circuitry, a second wireless signal associated with a second wireless communication protocol different from the first wireless communication protocol, the received second wireless signal characterized by a frequency bandwidth of the second wireless signal;
spectrally shift, by the spectral placement circuitry, an in-phase (I) component of the received first wireless signal to a frequency space beyond the frequency bandwidth, the spectral shift including mixing the I component and quadrature phase (Q) component of the first wireless signal with corresponding I and Q components of a mixing signal;
spectrally shift, by the spectral placement circuitry, the Q component of the received first wireless signal to the same frequency space beyond the frequency bandwidth, the spectral shift including mixing the I and Q components of the first wireless signal with corresponding Q and I components of the mixing signal; and
generate, by signal combiner circuitry, a composite wireless signal comprising, at an instant in time, an I composite component and a Q composite component, each composite component including a first component based on the spectrally-shifted first baseband wireless signal, and a second component based on the second wireless signal.

36. The circuitry of claim 35, wherein the circuitry is operable to spectrally generate the composite signal by, at least in part, operating to combine the spectrally-shifted first wireless signal and the second wireless signal, which has not been spectrally shifted.

* * * * *